United States Patent [19]

Morita

[11] Patent Number: 4,484,318
[45] Date of Patent: Nov. 20, 1984

[54] CIRCUIT ARRANGEMENT AND METHOD FOR DETECTING UNRECORDED ZONES OF A PHONOGRAPH RECORD

[75] Inventor: Yutaka Morita, Yokohama, Japan

[73] Assignee: Victor Company of Japan, Limited, Yokohama, Japan

[21] Appl. No.: 475,816

[22] Filed: Mar. 16, 1983

[30] Foreign Application Priority Data

Mar. 25, 1982 [JP] Japan .................................. 57-47747

[51] Int. Cl.³ .......................... G11B 3/38; G11B 17/06
[52] U.S. Cl. ......................................... 369/41; 369/33
[58] Field of Search ............................. 369/33, 41, 56

[56] References Cited

U.S. PATENT DOCUMENTS

| | | | |
|---|---|---|---|
| 4,079,944 | 3/1978 | Durley et al. .......................... | 369/56 |
| 4,093,832 | 6/1978 | Isaacson et al. ...................... | 369/41 |
| 4,375,092 | 2/1983 | Yoshio ................................... | 369/41 |
| 4,375,093 | 2/1983 | Takahashi ............................. | 369/41 |

*Primary Examiner*—Steven L. Stephan
*Attorney, Agent, or Firm*—Pollock, Vande Sande & Priddy

[57] ABSTRACT

An output signal from a photodetector (3) responsive to light reflected at a phonograph record (2) is differentiated to produce positive and negative differential pulses ($b_{1+}$, $b_{1-}$), and the positive differential pulse ($b_{1+}$) is retarded by a time length substantially equal to the time difference between the positive and negative differential pulses ($b_{1+}$, $b_{1-}$), while the negative differential pulse ($b_{1-}$) is inverted to be a positive signal (d). The retarded signal (c) is added to the positive signal (d) so that the amplitude of the positive signal (d) becomes greater than before when the timing of the positive signal matches with the retarded signal (c). A resultant sum signal (e) produced in this way will be compared with a reference value ($V_{TH1}$) to detect only unrecorded zones thereby accurately distinguishing unrecorded zones from recorded zones. The circuit arrangement therefore, comprises a differentiator (4), a circuit ($D_1$, $D_2$) for separating the positive differential pulse ($b_{1+}$) from the negative differential pulse ($b_{1-}$), a delay circuit (6), an inverting circuit (7), an adder (8), and a comparator (9).

8 Claims, 12 Drawing Figures

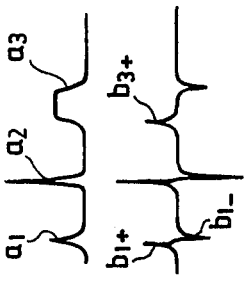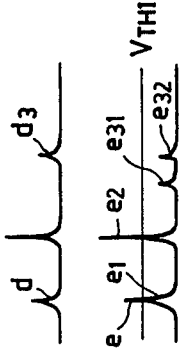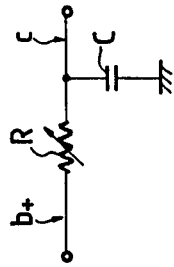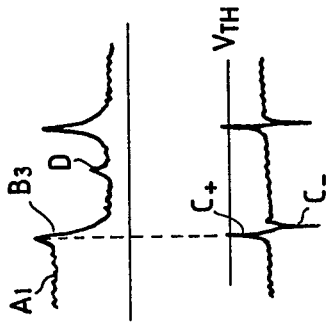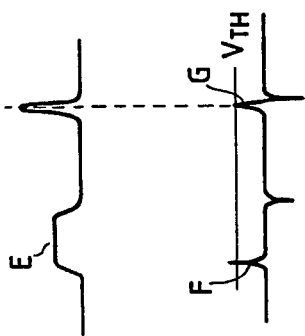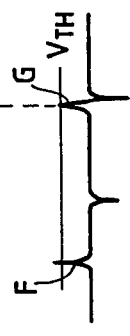

CIRCUIT ARRANGEMENT AND METHOD FOR DETECTING UNRECORDED ZONES OF A PHONOGRAPH RECORD

BACKGROUND OF THE INVENTION

This invention relates generally to circuit arrangements for detecting unrecorded zones of a phonograph record by means of a photodetector so that the movement of a tonearm carrying a stylus is controlled to position the stylus at a desired unrecorded zone to playback a selected music or information piece.

Various devices and circuits designed to detect unrecorded zones between consecutive music or information pieces for the above-mentioned purpose are known. In conventional devices, light emitted from a light source, such as a lamp or a light-emitting diode, is applied to a phonograph record so that light reflected at the surface thereof is received by a photodetector. Since the reflection coefficient at unrecorded zones is much higher than that of recorded zones or sound groove portions, the unrecorded zones can be detected by watching the intensity of reflected light. Namely, an output signal from the photodetector is processed to distinguish unrecorded zones from sound groove zones.

In conventional circuit arrangements, therefore, the output signal from such a photodetector is differentiated so that the amplitude and/or the rising slope of the differential pulse is detected. However, as will be described later in detail, conventional devices are apt to produce false detection signals each indicative of an unrecorded zone, or to overlook unrecorded zones for various reasons. As a result, the pickup stylus is undesirably lowered onto a sound groove zone in the case of a false detection signal is generated, and therefore, there is a chance that the sound groove zones become damaged. In the case that unrecorded zones are overlooked, positioning of the stylus onto a desired unrecorded zone cannot be expected. Furthermore, when accurate differentiation between sound groove zones and unrecorded zones is difficult, it would take a long time to select a desired piece of music or information.

SUMMARY OF THE INVENTION

The present invention has been developed in order to remove the above-described drawbacks inherent to the conventional circuit arrangement for detecting unrecorded zones of a disc-record.

It is, therefore, an object of the present invention to provide a new and useful circuit arrangement and a method for detecting unrecorded zones of a phonograph record which is capable of accurately distinguishing unrecorded zones from recorded zones.

According to a feature of the present invention, the output signal from a photodetector responsive to reflected light from a phonograph record is differentiated to produce positive and negative differential pulses, and these positive and negative differential pulses are processed such that the positive differential pulse is retarded by a predetermined period of time, while the negative differential pulse is inverted to be a positive signal so that the retarded signal is added to the inverted signal to produce a resultant sum signal which will be compared with a reference value to detect unrecorded zones.

In accordance with the present invention there is provided a circuit arrangement for detecting unrecorded zones of a phonograph record, comprising: a differentiator responsive to an output signal from a photodetector which receives light reflected at the surface of the phonograph record; means for separating a positive differential pulse from a negative differential pulse both included in the output signal from the differentiator; a delay circuit for retarding the positive differential pulse by a predetermined period of time; an inverting circuit for inverting the negative differential pulse to produce another positive pulse; an adder for adding the output signal from the delay circuit to the output signal from the inverting circuit; and a comparator for producing an output signal when the amplitude of the output signal from the adder exceeds a predetermined value.

In accordance with the present invention, there is also provided a method of detecting unrecorded zones of a phonograph record, comprising the steps of: emitting light toward the phonograph record; receiving light reflected at the phonograph record for producing an electrical signal whose amplitude varies in accordance with the intensity of received reflected light; differentiating the electrical signal for producing a positive differential pulse and a negative differential pulse following the positive differential pulse; retarding the positive differential pulse by a predetermined time length for producing a retarded positive signal; inverting the negative differential pulse to produce another positive signal; adding the retarded positive signal to the another positive signal, for producing a resultant signal; and comparing the amplitude of the resultant signal with a reference value to produce an output signal when the amplitude exceeds the reference value.

BRIEF DESCRIPTION OF THE DRAWINGS

The object and features of the present invention will become more readily apparent from the following detailed description of the preferred embodiments taken in conjunction with the accompanying drawings in which:

FIG. 1 is a waveform chart showing an output signal from a photodetector used in devices for detecting unrecorded zones of a phonograph record;

FIGS. 2A and 2B are waveform charts showing operation in one conventional device;

FIGS. 3A and 3B are waveform charts showing operation in another conventional device;

FIGS. 5A through 5E are waveform charts useful for understanding the operation of the circuit of FIG. 4; and FIG. 6 is a circuit diagram of the delay circuit shown in FIG. 4.

The same or corresponding elements and parts are designated at like reference numerals throughout the drawings.

DETAILED DESCRIPTION OF THE INVENTION

Figure 4:
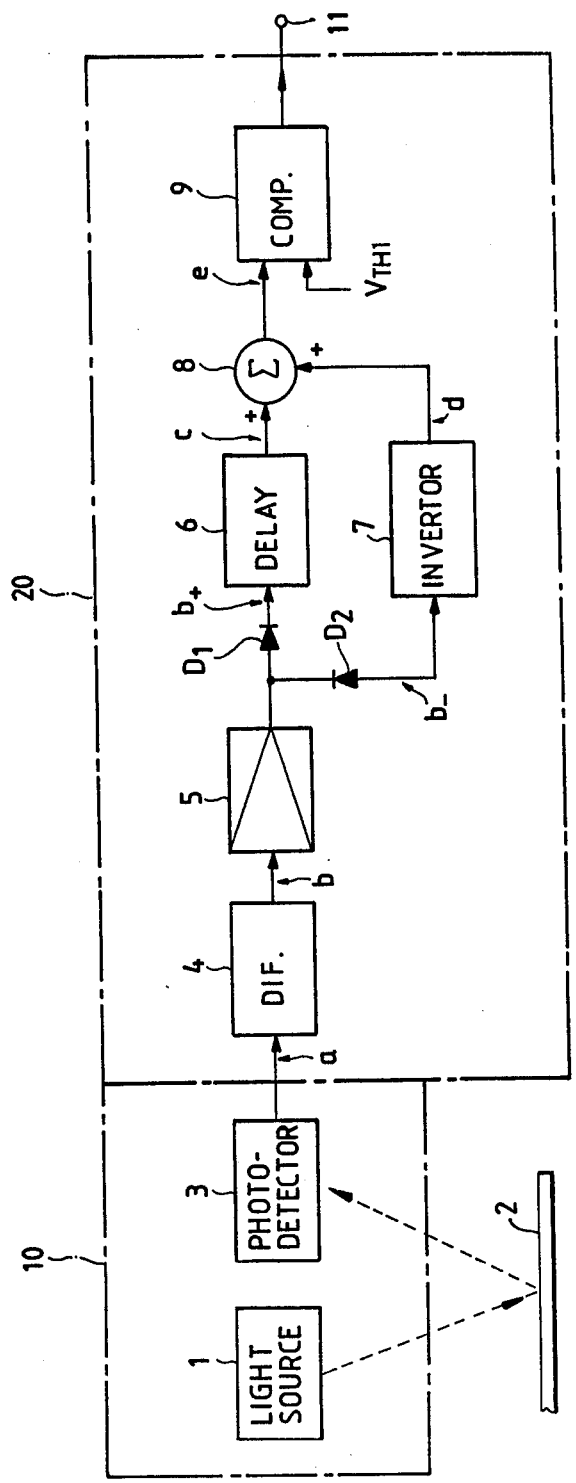
FIG. 4 is a schematic block diagram of an embodiment of the circuit arrangement according to the present invention.

Prior to describing the preferred embodiment of the present invention, conventional devices will be discussed for a better understanding of the present invention.

In an unrecorded zone device for a record player, light is emitted from a light source toward a phonograph record so as to receive light reflected there at by a photodetector, such as a photodiode, phototransistor or the like. FIG. 1 shows a waveform of an output signal from such a photodetector. Since the reflection coefficients at unrecorded zones are higher than those of recorded zones or sound groove portions, the amplitude of the photodetector varies as illustrated. In FIG. 1, references A, A', A'' indicate the output signal level corresponding to recorded zones, while references $B_1$ and $B_2$ indicate the output signal level corresponding to unrecorded zones. Output signals each indicative of an unrecorded zone will be referred to as unrecorded zone outputs, and output signals each indicative of a recorded zone or a sound groove portion will be referred to as sound groove outputs hereafter.

In an example of a conventional unrecorded zone detecting device, an output signal from a photodetector is differentiated to check whether a positive pulse thereof exceeds a threshold to detect an unrecorded zone. However, such a device has a drawback such that when an unrecorded zone output $B_3$, as shown in FIG. 2A, comes immediately after a sound groove outut $A_1$ derived from a sound groove portion having a coarse pitch, its differential pulse is such that a low level positive pulse $C_+$ and a high level negative pulse $C_-$ are respectively obtained as shown in FIG. 2B. Therefore, if only the amplitude of the positive pulse $C_+$ is compared with a threshold $V_{TH}$, this positive pulse $C_+$ cannot be detected. As a result, accurate distinguishment between sound grooves and unrecorded zones cannot be expected.

On the other hand, in another conventional device, a dull rising edge of a sound groove output and a sharp rising edge of an unrecorded zone output are respectively detected for distinguishing unrecorded zones from sound groove portions. However, this device has a drawback such that when a sharply rising waveform D (having a low level) like an unrecorded zone output exists in the sound groove output as shown in FIG. 2A, this sharply rising waveform has a chance to be detected as an unrecorded zone although it represents actually a sound groove portion, and therefore, accurate distinguishment between unrecorded zone and sound groove portions cannot be achieved.

Furthermore, if only the level or rising slope of differential pulses is detected as in the above-mentioned conventional devices, when a sound groove output E whose level variation is relatively large is detected as shown in FIG. 3A, the level of a corresponding differential pulse F is as large as the level of an unrecorded zone pulse G as shown in FIG. 3B. As a result, the sound groove portion is erroneously detected as an unrecorded zone so that accurate distinguishment between unrecorded zones and sound groove portions cannot be attained.

The present invention removes the above-described drawbacks, and an embodiment thereof will be described with reference to FIGS. 4 and 5A–5E hereafter.

FIG. 4 shows a block diagram of an embodiment of an unrecorded zone detecting device for a record player according to the present invention. The unrecorded zone detecting device of FIG. 4 comprises a photodetecting circuitry 10 and a signal processing circuitry 20. The photodetecting circuitry 10 is mounted on the tonearm (not shown) of a record player so that scanning along the surface of a phonograph record 2 is carried out. The photodetecting circuitry 10 generally comprises a light source 1 and a photodetector 3. The photodetecting circuitry 10 per se is well known in the art, and a device such as disclosed in U.S. Pat. No. 4,079,944 may be used. Light from the light source 1 is applied to the phonograph record 2, and light reflected thereat is incident on the photodetector 3 so that an output signal such as shown in FIG. 5A will be derived.

In FIG. 5A references $a_1$ and $a_2$ are unrecorded zone outputs, and a reference $a_3$ is a sound groove output of relatively low frequency. The output a of the photodetector 3 is differentiated by a differentiator or a high-pass filter 4 to be converted into a differential pulse b having a positive pulse $b_{1+}$ and a negative pulse $b_{1-}$ as shown in FIG. 5B. The cut-off frequency of the differentiator 4 is determined by the relationship between the horizontal moving speed of the tonearm and the width of an unrecorded zone on a phonograph record.

The pulse b is preferably amplified by an amplifier 5, and then the positive pulse $b_+$ is fed through a diode D1 to a delay circuit 6, while the negative pulse $b_-$ is fed through another diode D2 to an inverting circuit 7. The positive pulse $b_+$ is retarded by the delay circuit 6 to become a signal c shown in FIG. 5C, while the negative pulse $b_-$ is inverted by the inverting circuit 7 to become a positive signal d shown in FIG. 5D. The amount of delay in the delay circuit 6 is set to a time substantially equal to the time difference between the positive pulse $b_{1+}$ and the negative pulse $b_{1-}$ both obtained by differentiating the unrecorded zone outputs $a_1$, $a_2$ . . . . This time difference between positive and negative pulses produced in response to an unrecorded zone, however, varies in accordance with the moving speed of the tonearm and the width of each unrecorded zone. Although it is possible to set the moving speed of the tonearm to a predetermined value, the width of each unrecorded zone has variations throughout various phonograph records. For this reason, when the amount of delay is preset in the delay circuit 6, the amount of delay does not necessarily equal the above-mentioned time difference. However, since the rising edge and the falling edge of the positive pulse $b_+$ are made dull (see waveform c in FIG. 5C) as it is transmitted through the delay circuit 6, the amount of delay is not required to be accurately equal to the time difference as will be described later in further detail. If desired, the amount of delay may be manually changed as shown in FIG. 6. Namely, when the delay circuit 6 is comprised of a resistor and capacitor C as shown in FIG. 6, a variable resistor R may be used as the resistor so that the time constant of the delay circuit or an integrator can be manually changed. Namely, the user may select a desired amount of time delay which is most suitable for a given width of an unrecorded zone of a phonograph record that he or she wishes to playback.

The signal c from the delay circuit 6 and the signal d from the inverting circuit 7 are added to each other by an adder-amplifier 8 to become a signal e as shown in FIG. 5E. In this case, since the amount of delay at the delay circuit 6 is substantially set to the time difference between the positive pulse $b_{1+}$ and the negative pulse $b_{1-}$, if a delayed positive pulse c is added to an undelayed pulse d, the amplitude of their resultant signals e1 and e2 becomes greater than the amplitude of any of these pulses $b_{1+}$ and $b_{1-}$. On the contrary, a signal $c_3$ obtained by retarding a pulse $b_{3+}$, which has been derived in response to a rising edge of a sound groove output $a_3$, is not added to a signal $d_3$ obtained by differentiating the falling edge thereof. As a result, the amplitude of signals $e_{31}$ and $e_{32}$, at the output of the adder-amplifier 8, corresponding to the signals $c_3$ and $d_3$ respectively, is smaller than that of signals $e_1$ and $e_2$. The output e of the adder 8 is fed to a comparator 9 in which a threshold $V_{TH1}$ is preset, so as to be compared with the threshold $V_{TH1}$ to detect signals $e_1$ and $e_2$ which are greater than the threshold $V_{TH1}$, and the detected signals are derived from an output terminal 10.

In this case, since the threshold $V_{TH1}$ for the comparator 9 is set to a value with which the level of the signal obtained by adding the positive pulses to the negative pulses, which are both obtained by differentiating the unrecorded zone pulses, there is no fear of erroneously detecting sound groove outputs as unrecorded zone outputs even if sound groove outputs of relatively large level variation, as described with reference to FIGS. 3A and 3B, are applied. Furthermore, when an unrecorded zone output having a low level positive differential pulse, comes in as described with reference to FIGS. 2A and 2B, it can be accurately detected as an unrecorded zone.

The amount of time delay in the delay circuit 6 is not necessarily equal to the time difference between the positive and negative differential pulses $b_{1+}$ and $b_{1-}$ derived in response to an unrecorded zone. However, since the positive differential pulse $b_{1+}$ is integrated so that the rising and falling edges of the pulse become dull as shown by the waveform of the signal c of FIG. 5C, the width of the signal c is made longer than that of the positive differential pulse $b_{1+}$. Accordingly, a slight difference in timing between the peak of the signal c and the peak of the signal d does not raise a serious problem. Namely, the amplitude of the resultant signal $e_1$ becomes larger than that of the signal d as long as the signal d is added to the signal c within a period that the signal c has an amplitude greater than its base line.

From the foregoing it will be understood that even if the level of a positive differential pulse is low as in the case of detecting an unrecorded zone existing next to a coarse sound groove portion, it is possible to increase the level by adding the positive differential pulse to a negative differential pulse, and therefore, an unrecorded zone can be accurately detected when compared with a conventional device in which only the level of the positive differential pulse is compared with a threshold, and misdetection of a low-level and sharply rising sound groove output as an unrecorded zone output is effectively prevented, and furthermore, since the level of a signal obtained by adding a positive differential and negative pulse to each other is low in connection with sound groove portions whose frequency is relatively low, and therefore misdetection of such a signal as an unrecorded zone signal is prevented. As described in the above, the present invention has an advantage that sound groove portions and unrecorded zones can be accurately distinguished from each other when compared with conventional devices.

Although the embodiment of the present invention has been described as a circuit arrangement constructed as analog signal processing circuit, the circuit arrangement may be actualized by a digital signal processing circuit. For instance, the delay circuit 6, inverting circuit 7, adder-amplifier 8 and the comparator 9 of FIG. 4 may be replaced by a microcomputer which is programmed to store the amplitude of the positive and negative differential pulses, to add the amplitude of the positive differential pulse to the absolute amplitude of the negative differential pulse when a predetermined period of time has elapsed, and to compare the the resultant amplitude with a reference value.

The above-described embodiment is just an example of the present invention, and therefore, it will be apparent for those skilled in the art that many modifications and variations may be made without departing from the spirit of the present invention.

What is claimed is:

1. A circuit arrangement for detecting unrecorded zones of a phonograph record, comprising:
   (a) a differentiator responsive to an output signal from a photodetector which receives light reflected at the surface of the phonograph record;
   (b) means for separating a positive differential pulse from a negative differential pulse both included in the output signal from said differentiator;
   (c) a delay circuit for retarding said positive differential pulse by a predetermined period of time;
   (d) an inverting circuit for inverting said negative differential pulse to produce another positive pulse;
   (e) an adder for adding the output signal from said delay circuit to the output signal from said inverting circuit; and
   (f) a comparator for producing an output signal when the amplitude of the output signal from said adder exceeds a predetermined value.

2. A circuit arrangement as claimed in claim 1, wherein said means for separating the positive differential pulse from the negative differential pulse comprises a pair of diodes.

3. A circuit arrangement as claimed in claim 1, wherein said delay circuit comprises a resistor and a capacitor which are connected to each other to constitute an integrator.

4. A circuit arrangement as claimed in claim 3, wherein said resistor comprises a variable resistor.

5. A circuit arrangement as claimed in claim 1, wherein said adder comprises an amplifier.

6. A circuit arrangement as claimed in claim 1, further comprising an amplifier interposed between said differentiator and said means for separating the positive differential pulse from the negative differential pulse.

7. A method of detecting unrecorded zones of a phonograph record, comprising the steps of:
   (a) emitting light toward said phonograph record;
   (b) receiving light reflected at said phonograph record for producing an electrical signal whose amplitude varies in accordance with the intensity of received reflected light;
   (c) differentiating said electrical signal for producing a positive differential pulse and a negative differential pulse following said positive differential pulse;
   (d) retarding said positive differential pulse by a predetermined time length for producing a retarded positive signal;
   (e) inverting said negative differential pulse to produce another positive signal;
   (f) adding said retarded positive signal to said another positive signal, for producing a resultant signal; and
   (g) comparing the amplitude of said resultant signal with a reference value to produce an output signal when the amplitude exceeds said reference value.

8. A method as claimed in claim 7, wherein the step of retarding comprising a step of integrating said positive differential pulse so that rising and falling edges of said positive differential pulse are made dull.

* * * * *